US009973747B2

(12) United States Patent
Laurent et al.

(10) Patent No.: US 9,973,747 B2
(45) Date of Patent: May 15, 2018

(54) METHOD FOR THE SYNCHRONIZATION OF 3D DEVICES AND CORRESPONDING SYNCHRONIZATION DEVICE

(71) Applicant: THOMSON LICENSING, Issy de Moulineaux (FR)

(72) Inventors: Anthony Laurent, Vignoc (FR); Eric Gautier, Rennes (FR); Philippe Gilberton, Geveze (FR)

(73) Assignee: Thomson Licensing DTV, issy-les-Moulineaux (FR)

( * ) Notice: Subject to any disclaimer, the term of this patent is extended or adjusted under 35 U.S.C. 154(b) by 280 days.

(21) Appl. No.: 14/345,272

(22) PCT Filed: Sep. 18, 2012

(86) PCT No.: PCT/EP2012/068300
§ 371 (c)(1),
(2) Date: Mar. 17, 2014

(87) PCT Pub. No.: WO2013/041509
PCT Pub. Date: Mar. 28, 2013

(65) Prior Publication Data
US 2015/0035956 A1    Feb. 5, 2015

(30) Foreign Application Priority Data

Sep. 20, 2011    (FR) ...................................... 11 58320

(51) Int. Cl.
*H04N 13/04*    (2006.01)
*H04N 21/43*    (2011.01)
(Continued)

(52) U.S. Cl.
CPC ..... *H04N 13/0497* (2013.01); *H04N 13/0438* (2013.01); *H04N 21/4302* (2013.01);
(Continued)

(58) Field of Classification Search
CPC ............................ H04N 13/0438; F21V 13/10
(Continued)

(56) References Cited

U.S. PATENT DOCUMENTS 7,289,539 B1    10/2007  Mimberg
2010/0066816 A1   3/2010  Kane et al.
(Continued)

OTHER PUBLICATIONS

IEEE Std 1588-2002, "IEEE Standard for a Precision Clock Synchronization Protocol for Networked Measurement and Control Systems", IEEE Instrumentation and Measurement Society, Nov. 8, 2002.
(Continued)

*Primary Examiner* — Jamie Atala
*Assistant Examiner* — Masum Billah
(74) *Attorney, Agent, or Firm* — Myers Wolin LLC

(57) ABSTRACT

The invention relates to a method for the synchronization of a set of 3D devices suitable for the processing of data representative of at least one stereoscopic image comprising a first image and a second image. In order to synchronize the 3D devices involved in the rendering of the at least one stereoscopic image, the method comprises the steps for:
creating at least a first group comprising at least two 3D devices according to information representative of at least a property associated with each of the at least two 3D devices, said at least one first group comprising at least a pair of active glasses and at least a display device suitable for the sequential display of the first and second images,
creating a second group comprising at least a second 3D device not belonging to the first group according to a second item of information representative of at least one property associated with said at least one second 3D device, (Continued)

Figure 1:
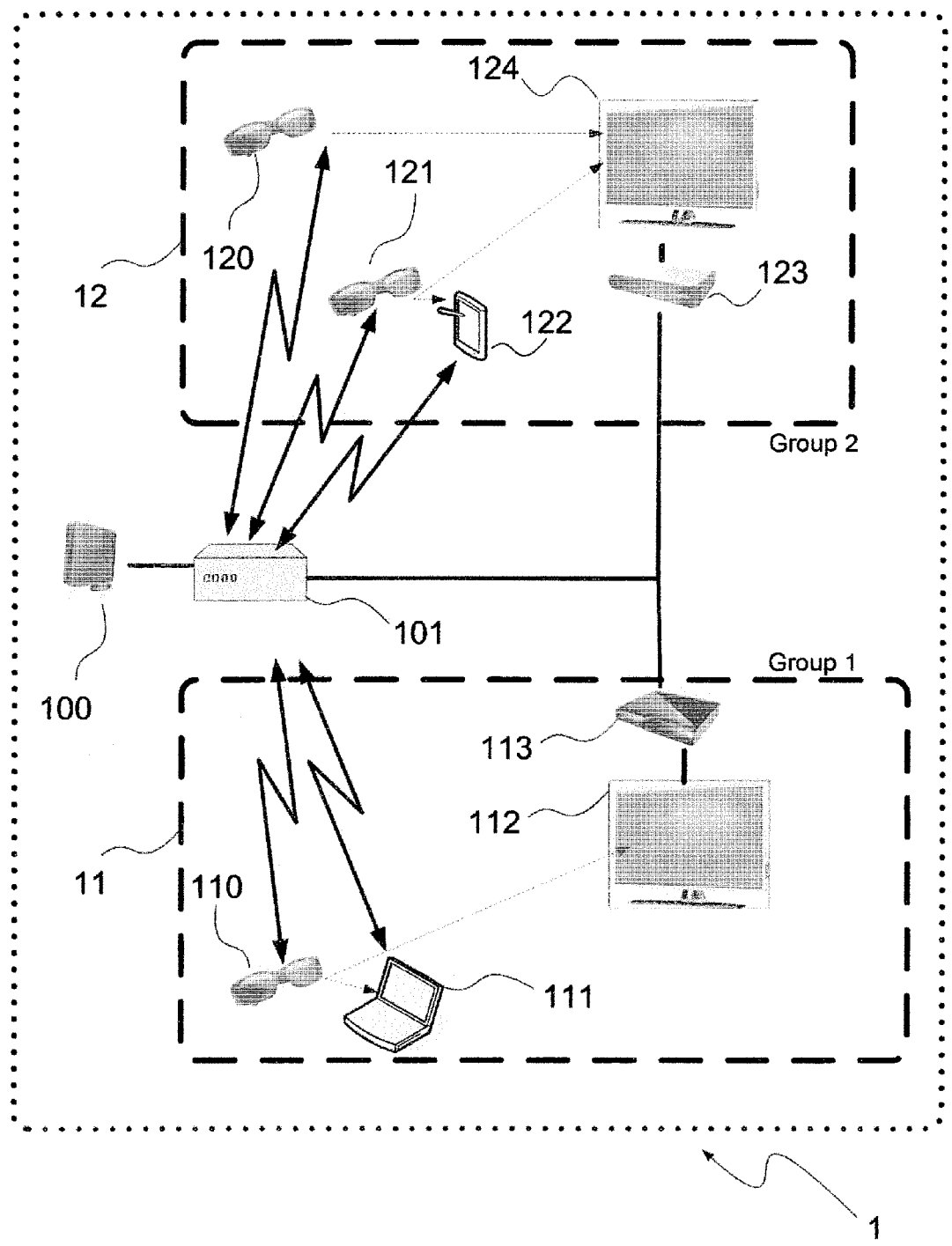

transmitting a first item of synchronization information to the at least two 3D devices so as to synchronize the at least two 3D devices for the rendering of the at least one stereoscopic image.

The invention also relates to a synchronization device.

18 Claims, 5 Drawing Sheets

(51) Int. Cl.
*H04N 21/6405* (2011.01)
*H04N 21/81* (2011.01)

(52) U.S. Cl.
CPC ....... *H04N 21/6405* (2013.01); *H04N 21/816* (2013.01); *H04N 2013/0465* (2013.01); *H04N 2213/008* (2013.01)

(58) Field of Classification Search
USPC ..................................... 348/43, 54
See application file for complete search history.

(56) References Cited

U.S. PATENT DOCUMENTS

| | | |
|---|---|---|
| 2010/0194857 A1 | 8/2010 | Mentz et al. |
| 2010/0309535 A1 | 12/2010 | Landowski et al. |
| 2010/0315316 A1* | 12/2010 | Mihara ............. H04N 13/0497 345/32 |
| 2011/0001808 A1 | 1/2011 | Mentz et al. |
| 2011/0025821 A1 | 2/2011 | Curtis |
| 2011/0090324 A1* | 4/2011 | Mentz ................ H04N 13/0438 348/55 |
| 2011/0164118 A1 | 7/2011 | Choi et al. |
| 2011/0316847 A1* | 12/2011 | Cheng ................ G02B 27/2264 345/419 |

OTHER PUBLICATIONS

Mills et al., "Network Time Protocol Version 4: Protocol and Algorithms Specification", Internet Engineering Task Force (IETF) ISSN: 2070-1721, http://www.ietf.org/rfc/rfc5905.txt, Jun. 2010.

Park et al., "A Sync Processor with Noise Robustness for 3DTV Active Shutter Glasses", ISOCC 2010, pp. 147-149, IEEE Copyright 2010.

Search Rept: dated Oct. 19, 2012.

* cited by examiner

METHOD FOR THE SYNCHRONIZATION OF 3D DEVICES AND CORRESPONDING SYNCHRONIZATION DEVICE This application claims the benefit, under 35 U.S.C. § 365 of International Application PCT/EP2012/068300, filed Sep. 18, 2012, which was published in accordance with PCT Article 21(2) on Mar. 28, 2013 in English and which claims the benefit of French patent application No. 1158320, filed Sep. 20, 2011.

1. SCOPE OF THE INVENTION

The invention relates to the field of synchronization of devices suitable for processing three-dimensional (3D) video contents, i.e. suitable for example for the decoding, the display or the rendering of 3D contents.

2. PRIOR ART

According to the prior art, there are several technologies enabling 3D video contents to be displayed. These technologies are applied in particular to 3D display devices which are divided into two main groups. One finds in a first group the display devices requiring the use of glasses, and in a second group the display devices not requiring the use of glasses, generally called auto-stereoscopic display devices and based for example on the technology of lenticular networks.

Among the display devices of the first group, there are display devices requiring the use of so-called passive glasses using polarized glasses, the right lens being polarized in one direction and the left lens polarized in the other direction. There are also display devices requiring the use of so-called active glasses. In systems using active glasses, the left and right images of a stereoscopic content are displayed sequentially, i.e. one after the other on the display device. It is then necessary that the associated (active) glasses can block the vision of the eye which must not see the displayed image while the other eye watches it (for example, only the right eye must be able to watch the right image and only the left eye must be able to watch the left image). This is obtained by the use of active glasses which integrate for example a LCD ("Liquid Crystal Display") panel per lens, the LCD panel letting the light pass or not, i.e. the displayed (right or left) image. To do this, the active glasses must be synchronized with the display device so that the blocking of the vision of the left eye only occurs during the display of the right image and so that the blocking of the vision of the right eye only occurs during the display of the left image. The active glasses associated with a given 3D display device are therefore synchronized with the latter and controlled by the latter.

With the increased supply in the field of 3D, for example at the level of display devices, a user wearing active glasses can be led to watch different 3D display devices each having for example a specific display frequency and/or a display time of the left and right images. If the glasses are compatible with one of the 3D display devices but not with the other one, the rendering of the different 3D contents displayed on the different 3D display devices at the level of the glasses will then only be correct and acceptable for the display device compatible with the active glasses. If the glasses are compatible with the different 3D display devices, each display device displaying the left and right images at a rate which is specific to it, the rendering of the different 3D contents displayed on the different 3D display devices at the level of the glasses will then only be correct and acceptable for the 3D display device which will control the glasses. Likewise, if several users wearing different active glasses are led to watch different 3D contents displayed on the same 3D display device, only the user or users wearing the active glasses associated (therefore synchronized) with the 3D display device and with a particular content in question will have an acceptable rendering of the displayed 3D content.

3. SUMMARY OF THE INVENTION

The purpose of the invention is to overcome at least one of these disadvantages of the prior art.

More particularly, the purpose of the invention in particular is to synchronize 3D devices involved in the rendering of 3D contents.

The invention relates to a method for the synchronization of a set of 3D devices suitable for the processing of data representative of at least one stereoscopic image, the at least one stereoscopic image comprising a first image and a second image representative of the same scene according to respectively a first point of view and a second point of view. The method comprises the steps for:
  creating a first group comprising at least two first 3D devices of the set of 3D devices according to a first item of information representative of at least a property associated with each of the at least two first 3D devices, the first group comprising at least one pair of active glasses and at least a display device suitable for a sequential display of the first and second images of the at least one stereoscopic image,
  creating a second group comprising at least a second 3D device of the set according to a second item of information representative of at least one property associated with the at least one second 3D device and different from the first item of information, the at least one second 3D device of the second group not belonging to the first group, and
  transmitting a first item of synchronization information to the at least two 3D devices of the at least one first group so as to synchronize the at least two 3D devices for the rendering of the at least one stereoscopic image.

According to a particular characteristic, the method comprises a step for receiving information representative of properties associated with each of the at least two first 3D devices and with the at least one second 3D device.

Advantageously, the method comprises a step for associating a 3D device suitable for providing the data representative of the at least one stereoscopic image with the first group.

According to a specific characteristic, the method also comprises the following steps for:
  de-associating the at least one pair of active glasses from the first group;
  associating the at least one pair of active glasses with the second group comprising the at least one second 3D device.

According to another characteristic, the method comprises a step for transmitting a second synchronization information intended for the at least one second group in order to synchronize the 3D devices of the second group for the rendering of the at least one stereoscopic image.

Advantageously, the at least one property is chosen among:
  a stereoscopic image display frequency;
  a shutting frequency;
  a stereoscopic image transmission frequency;

a compatibility with a packing format of data representative of a stereoscopic image.

According to another characteristic, the method comprises a step for estimating the maximum transmission time of the first item of synchronization information to the 3D devices of the first group, the first item of synchronization information taking account of the maximum transmission time.

According to a particular characteristic, the first item of synchronization information transmitted to the 3D devices of the first group depends on the time of execution of an instruction by a 3D device associated with each 3D device of the first group.

Advantageously, the method comprises a step for transmitting at least one control message representative of an instruction to be executed to the first group, the at least one control message being associated with at least one 3D device of the first group.

Advantageously, the first item of synchronization information is transmitted via a wireless transmission channel.

According to another characteristic, the first item of synchronization information is transmitted via a wired transmission channel.

The invention also relates to a device for the synchronization of a set of 3D devices suitable for the processing of data representative of at least one stereoscopic image, the at least one stereoscopic image comprising a first image and a second image representative of the same scene according to respectively a first point of view and a second point of view, the device comprising:
 means for creating a first group comprising at least two first 3D devices of the set of 3D devices according to a first information representative of at least a property associated with each of the at least two first 3D devices, the first group comprising at least one pair of active glasses and at least a display device suitable for a sequential display of the first and second images of the at least one stereoscopic image,
 means for creating a second group comprising at least a second 3D device of the set according to a second information representative of at least one property associated with the at least one second 3D device and different from the first information, the at least one second 3D device of the second group not belonging to the first group, and
 means for transmitting a first item of synchronization information to the at least two 3D devices of the at least one first group so as to synchronize the at least two 3D devices for the rendering of the at least one stereoscopic image.

Advantageously, the device comprises means for receiving information representative of properties associated with each of the at least two 3D devices.

According to a particular characteristic, the device comprises:
 means for de-associating the at least one pair of active glasses from the first group;
 means for associating the at least one pair of active glasses with the second group comprising the at least one second 3D device.

According to another characteristic, the device comprises means for transmitting a second item of synchronization information to the at least one second group so as to synchronize the 3D devices of the second group for the rendering of the at least one stereoscopic image.

4. LIST OF FIGURES

Figure 2:
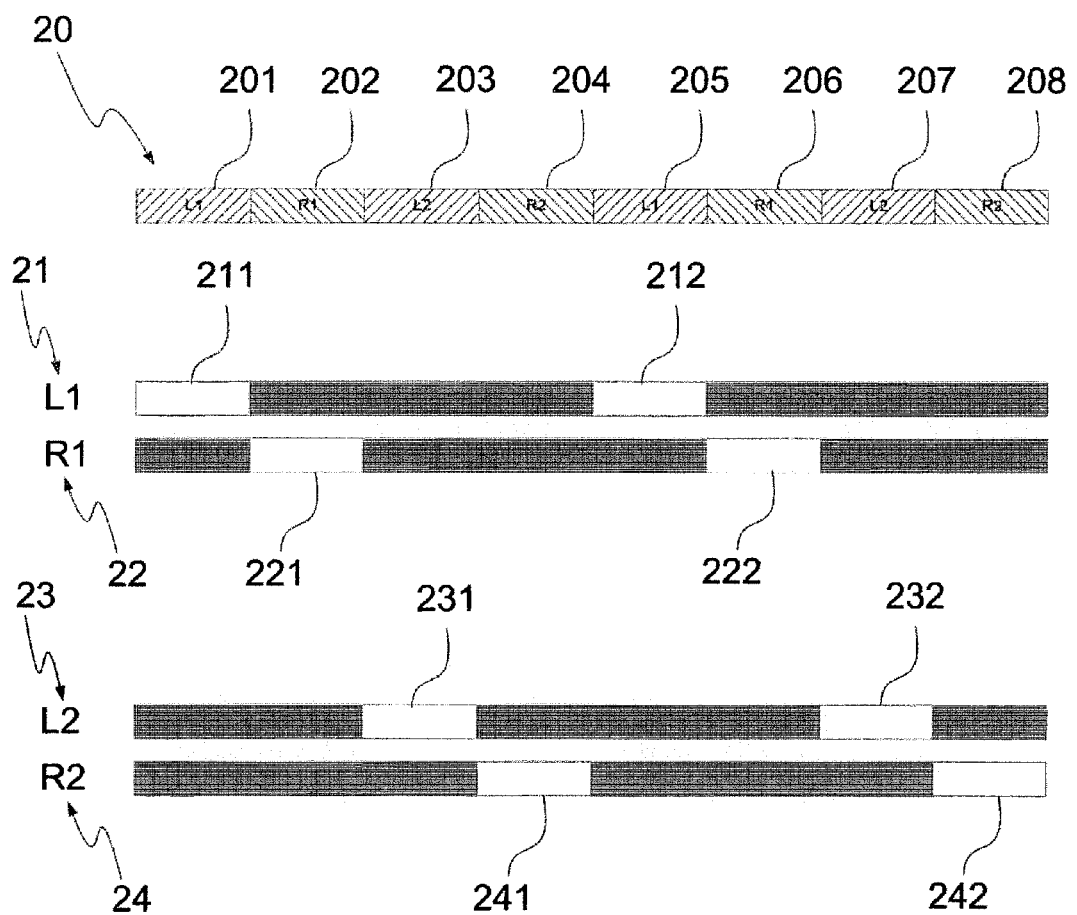
Figure 3:
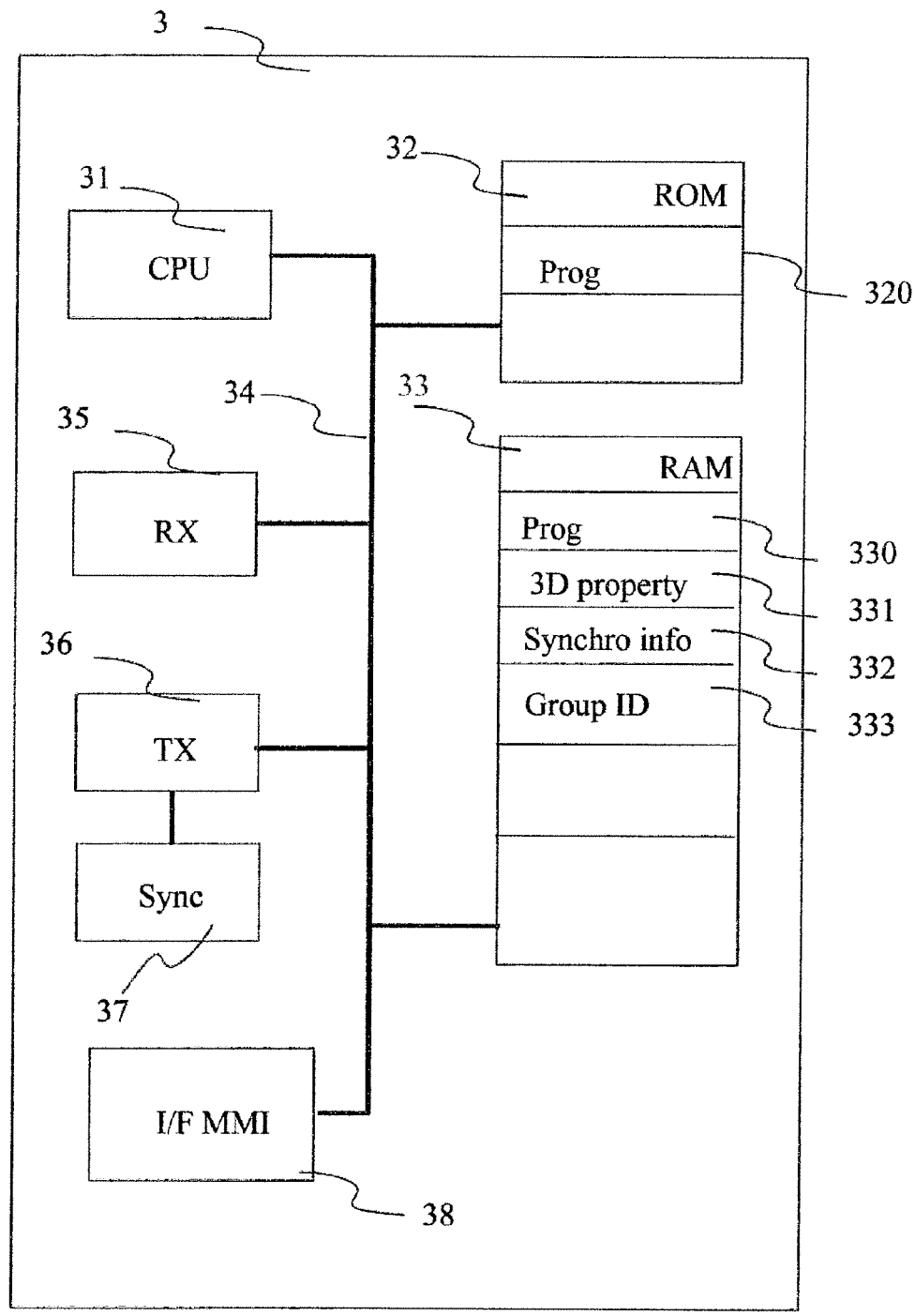
Figure 4A:
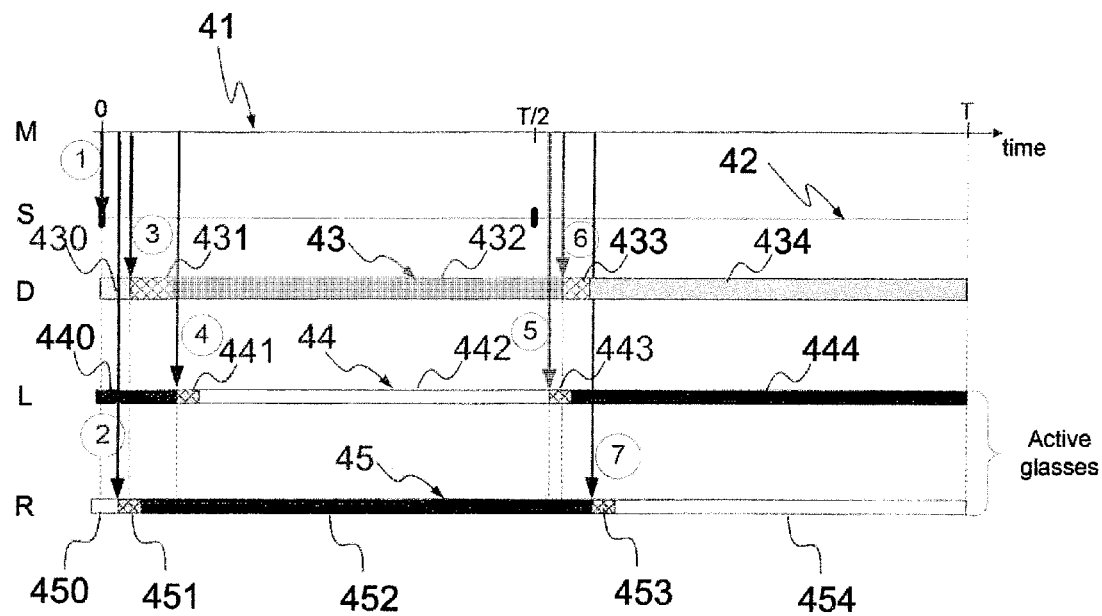
Figure 4B:
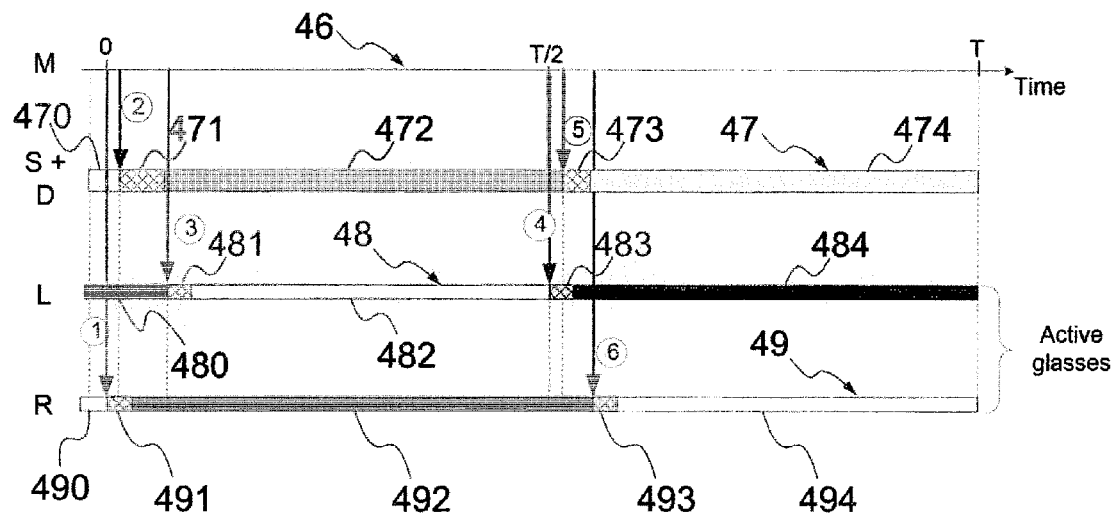
Figure 5:
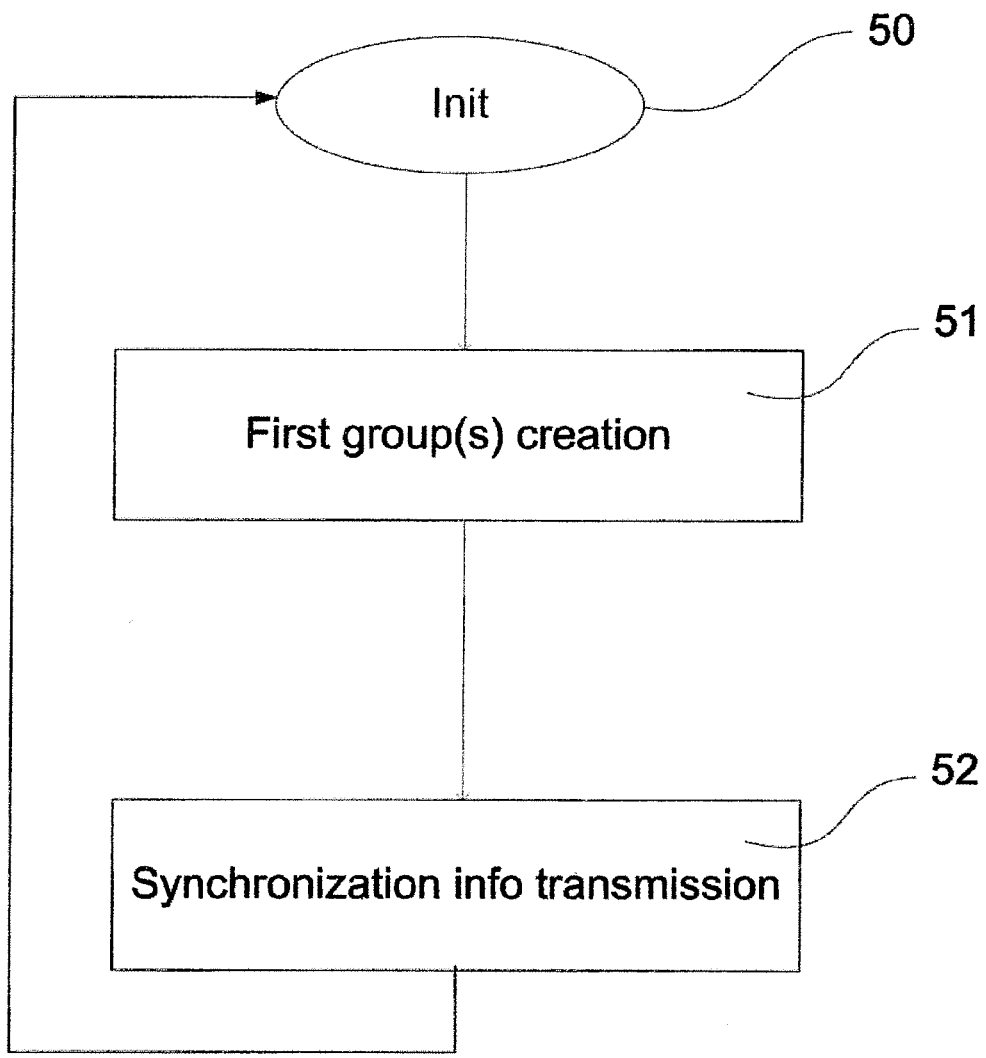

The invention will be better understood, and other specific features and advantages will emerge upon reading the following description, the description making reference to the annexed drawings wherein:

FIG. 1 illustrates a network comprising several different 3D devices and a synchronization module, according to a particular embodiment of the invention, FIG. 2 illustrates the sequence of frames of two different 3D contents for rendering on a 3D display device of the network of FIG. 1, according to a particular embodiment of the invention, FIG. 3 diagrammatically illustrates the structure of the synchronization module of FIG. 1, according to a particular embodiment of the invention, FIGS. 4A and 4B illustrate the sequencing of instructions scheduled by the synchronization module of FIG. 1 for the synchronization of the 3D devices of FIG. 1, according to two particular embodiments of the invention;

FIG. 5 illustrates a synchronization method implemented in a synchronization module of FIG. 3, according to a particular embodiment of the invention.

5. DETAILED DESCRIPTION OF EMBODIMENTS OF THE INVENTION

The invention will be described with reference to a particular embodiment of a method for synchronizing a set of 3D devices, i.e. devices suitable for the processing of data representative of one or more stereoscopic images. A stereoscopic image is advantageously composed of a first image (for example a left image) and a second image (for example a right image), the first and the second image representing the same scene seen from two different points of view, the synthesis of the first image and of the second image by the brain of a user enabling three-dimensional scene image rendering to be obtained. According to the particular non-restrictive embodiment described, one (or more) first group of 3D devices is generated so as to regroup at least two 3D devices among the set of 3D devices. This first group comprises at least a pair of active glasses and a display device capable of sequentially displaying the first and second images. The system formed by the pair of active glasses and the display device enables the stereoscopic image to be rendered in three dimensions. The first group is advantageously formed from information representative of specific properties associated with each of the 3D devices of the first group. A second group comprising one or more 3D devices of the set of 3D devices is also created. The 3D device or devices of this second group do not belong to the first group. As with the first group, the second group is advantageously formed from information representative of specific properties associated with each of the 3D devices of the second group. An item of synchronization information is then transmitted to each 3D device belonging to the first group. The item of synchronization information is representative of the time sequence of the first and second images of the stereoscopic image, i.e. for example of the order in which the first and second images will be displayed and of the frequency at which they will be displayed. The formation of one of more groups enables in this way several 3D devices which are able to communicate together, for example via an intermediate module, and which are likely to become synchronized via the receipt of the synchronization information to be regrouped. A user wearing the active glasses belonging to this first group can advantageously watch all the 3D display devices belonging to this first group, irrespective of the 3D content displayed on these display devices. The formation of several different groups (i.e. at least a first group and at least a second group) of 3D devices from different information representative of the specific properties of the 3D devices enables mutually compatible 3D devices to be regrouped while allowing to avoid possible interference at the level of a viewer wearing 3D glasses likely to have in his field of vision different 3D contents displayed on screens belonging to respectively the first group and the second group.

FIG. 1 illustrates a network 1 composed of several 3D devices and a synchronization module 100, according to a particular non-restrictive embodiment of the invention. The network 1 corresponds for example to a domestic network. The network 1 comprises a plurality of 3D devices, i.e. devices able to process data representative of a 3D video content for the rendering of the 3D video content by a system composed of a display device associated with at least one pair of active glasses. Among the 3D devices, the network 1 comprises in particular a synchronization module 100, a gateway 101 (for example of the ADSL or FTTH ("Fibre To The Home") or Wimax type), two screens 112 and 124, for example of the LCD, PDP ("Plasma Display Panel") or OLED ("Organic Light-Emitting Diode") type, a portable computer 111, a tablet 122, a 3D® blu-ray disc player 113, a set-top box 123 and three pairs of active glasses 110, 120 and 121. Except the synchronization module 100 and the gateway 101, the 3D devices are distributed into two different groups, namely a first group 11 and a second group 12. The first group 11 comprises the 3D® blu-ray disc player 113, the display screen 112, the portable computer 111 and the pair of active glasses 110. The second group 12 comprises the set-top box 123, the display screen 124, the 3D tablet 122 and two pairs of active glasses 120 and 121.

The pair of active glasses 110 and the portable computer 111 of the first group are advantageously connected to the gateway 101 via a wireless link, for example of the Wifi® type (for example according to the IEEE 802.11g or IEEE 802.11n standard). Likewise, the two pairs of active glasses 120 and 121 and the 3D tablet 122 are also connected to the gateway 101 via a wireless link, for example of the Wifi® type. The synchronization module is advantageously connected to the gateway 101 via a wired link, for example of the Ethernet type (according to the ISO/IEC 8802-3 standard). The gateway 101 is connected to the set-top box 123 of the second group as well as to the 3D® blu-ray disc player 113 of the first group via a wired link, for example of the Ethernet type. According to one variant, the gateway 101 is connected to the set-top box 123 and/or to the 3D® blu-ray disc player 113 via a wireless link, for example of the Wifi®. type The 3D® blu-ray disc player 113 is connected to the display screen 112 via a wired link, for example of the HDMI ("High Definition Multimedia Interface") type. Likewise, the set-top box 123 is connected to the display screen 124 via a wired link, for example of the HDMI type.

The first group 11 and the second group 12 of 3D devices are advantageously created by the synchronization module 100 after each of the 3D devices 110 to 113 and 120 to 123 has transmitted to the synchronization module 100 by means of the gateway 101 an item of information representative of its properties, for example the properties relative to the display frequency of stereoscopic images when the 3D device is a display screen, the shutting frequency when the 3D device is a pair of active glasses, the transmission frequency of stereoscopic images when the 3D device is a source of data representative of stereoscopic images (for example, the set-top box 123 and the 3D® blu-ray disc player 113), the compatibility with a packing format of data representative of the stereoscopic images. The first 11 and second 12 groups are formed according to the compatibilities between the 3D devices from information received from each of the 3D devices, two mutually incompatible 3D devices cannot belong to the same group. Two incompatible 3D devices correspond for example to a pair of active glasses whose shutting frequency cannot be synchronized with the display frequency of a display screen, typically when the values that can be taken for the shutting frequency are different from the values that can be taken for the display frequency. According to another example, two incompatible 3D devices correspond to a set-top box and a display screen using two different formats for the packing of data representative of stereoscopic images.

All the 3D devices belonging to the same group are perfectly synchronized with each other. Once the first and second groups 11 and 12 are formed, the synchronization module 100 transmits, by means of the gateway 101, to each 3D device 110 to 113 a first item of synchronization information enabling all the 3D devices 110 to 113 of the first group 11 to be perfectly synchronized with each other. The synchronization module 100 transmits, by means of the gateway 101, to each 3D device 120 to 124 a second item of synchronization information enabling all the 3D devices 120 to 124 of the second group 12 to be perfectly synchronized with each other. Advantageously, the first and second synchronisation information transmitted are contained in a single and same signal sent by the synchronization module 100 and retransmitted by the gateway 101. According to one variant, the first and second synchronisation information transmitted are contained in two different signals sent by the synchronization module 100 and retransmitted by the gateway 101. The first and second synchronization information comprise temporal indications on:

the precise time at which a 3D source (for example the set-top box 123, the 3D® blu-ray disc player 113 or the gateway 101) transmits a frame of data packets representative of the first and second images to a 3D display device (for example respectively the display screen 124, the display screen 112 or the 3D tablet 122 and the portable computer 111);

the precise times at which a display device displays the first and second images;

the precise shutting times of the left and right lenses of a pair of active glasses.

The 3D devices 110 to 113 of the first group being perfectly synchronized with each other (i.e. with a negligible temporal difference) (for example, less than 1 µs) between for example the display of an image (for example respectively a left or right image of a stereoscopic image) on a display screen and the right (respectively left) lens shutting time to hide the vision of the right (respectively left) eye, a user wearing the pair of active glasses 110 can perfectly watch the 3D contents displayed on the display screen 112 and on the portable computer 111 without any difficulty. Likewise, the 3D devices 120 to 124 are perfectly synchronized with each other, which enables two users wearing respectively the pair of active glasses 120 and the pair of active glasses 121 to watch without any difficulty the 3D contents displayed on the display screen 124 and on the 3D tablet 122. All the 3D devices 110 to 113 and 120 to 124 of the network 1 are controlled by and slave of the synchronization module 100 with respect to the times of transmission of 3D data frames of a given image (left or right) (for the 3D sources), of display of the given image (left or right) (for the display screens) and of corresponding lens shutting (right or left respectively) (for the active lenses).

According to one variant, the synchronization module 100 and the gateway 101 form a single and same hardware device. According to yet another variant, the synchronization module is comprised in one of the 3D devices of the network 1.

According to another variant, the synchronization module 100 is connected to the gateway by a wireless link, for example of the Wifi® type.

According to one variant not represented on FIG. 1, a group of 3D devices synchronized with each other comprises a single display device and several pairs of active glasses. According to this variant, a plurality of 3D contents is displayed on the single display device which enables users wearing the active glasses belonging to the group to watch each a different 3D content on the same display device. If L1 and R1 represent the left images and the right images respectively of a first 3D content and if L2 and R2 represent the left images and the right images respectively of a second 3D content different from the first 3D content, the display sequence of the right and left images of the two 3D contents is the following: L1, R1, L2, R2, L1, R1, L2, R2 . . . . The display of the first and second 3D contents is thus sequential from a temporal point of view, the display of the left and right images being also sequential from a temporal point of view for each 3D content. FIG. 2 illustrates such a sequence of information representative of the first and second images of two 3D contents corresponding to the left and right images of stereoscopic images. A frame 20 is temporally divided, the first time slot of the frame 201 comprising the data representative of the left image L1 of the first stereoscopic image of the first 3D content and the following time slot 202 comprising the data representative of the right image R1 of the first stereoscopic image of the first 3D content. A third time slot 203 following the second time slot 202 comprises the data representative of the left image L2 of the first stereoscopic image of the second content and the following time slot 204 comprises the data representative of the right image R2 of the first stereoscopic image of the second 3D content. Then the following time slot 205 comprises the data representative of the left image L1 of the second stereoscopic image of the first 3D content and the following time slot 206 comprises the data representative of the right image R1 of the second stereoscopic image of the first 3D content. Then the following time slot 207 comprises the data representative of the left image L2 of the second stereoscopic image of the second 3D content and the following time slot 208 comprises the data representative of the right image R2 of the second stereoscopic image of the second 3D content and so on. FIG. 2 also illustrates the time slots during which the left lens 21 and the right lens 22 of a first pair of active glasses used for the rendering of the first 3D content are shut (in black) or let the light pass (in white). The left lens 21 of the first pair of active glasses lets the light pass during the time slots 211 and 212 corresponding temporally to the time slots 201 and 205 of the frame 20 during which the left images L1 of the first 3D content are displayed. During the other time slots of the frame 20, the left lens 21 of the first pair of active glasses is occulted. The right lens 22 of the first pair of active glasses lets the light pass during the time slots 221 and 222 corresponding temporally to the time slots 202 and 206 of the frame 20 during which the right images R1 of the first 3D content are displayed. During the other time slots of the frame 20, the right lens 22 of the first pair of active glasses is occulted. Likewise, the left lens 23 of the second pair of active glasses lets the light pass during the time slots 231 and 232 corresponding temporally to the time slots 203 and 207 of the frame 20 during which the left images L2 of the second 3D content are displayed. During the other time slots of the frame 20, the left lens 23 of the second pair of active glasses is occulted. The right lens 24 of the second pair of active glasses lets the light pass during the time slots 241 and 242 corresponding temporally to the time slots 204 and 208 of the frame 20 during which the right images R2 of the first 3D content are displayed. During the other time slots of the frame 20, the right lens 24 of the first pair of active glasses is occulted.

According to another example not illustrated on FIG. 2, several 3D contents are displayed on the same display device, the different 3D contents corresponding for example to the same video displayed with different disparities between the left and right images of the stereoscopic images, i.e. with different depth information, i.e. with amplitudes at the level of different 3D effects. According to this example, the frame 20 comprises for example in the first time slot 201 data representative of a first left image, in the second time slot 202 following temporally the first slot 201 data representative of a first right image (having a first disparity with respect to the first left image) and in the third time slot 203 following temporally the second slot 202 data representative of a second right image (having a second disparity with respect to the first left image). So, the pairs [first left image/first right image] and [first left image/second right image] represent the same scene (or the same video) but with different depths (i.e. different 3D levels). The same scheme is then repeated for other stereoscopic images, namely temporally: left image, right image with first disparity, right image with second disparity.

FIG. 3 diagrammatically illustrates a hardware embodiment of a synchronization module 3 corresponding for example to the synchronization module 100 of FIG. 1.

The synchronization module 3 comprises the following elements, connected together by a bus 34 of addresses and data that also transports a clock signal:
- a microprocessor 31 (or CPU);
- a non-volatile memory of the ROM ("Read Only Memory") type 32;
- a random access memory or RAM 33;
- an interface 35 suitable for receiving data (for example information representative of the properties of the 3D devices of the network 1);
- an interface 36 suitable for transmitting data (for example a synchronization signal);
- an interface 37 suitable for receiving a synchronisation signal and for synchronising the interface 36, and/or
- an MMI (Man Machine Interface) interface 38 or a specific application adapted for the display of information for a user and/or the input of data or parameters (for example, the parameterization of 3D device groups).

It is noted that the word "register" used in the description of the memories 32 and 33 designates, in each of the memories mentioned, a memory zone of low capacity (some binary data) as well as a memory zone of large capacity (enabling a whole programme to be stored or all or part of the data representative of data received or to be broadcast).

The memory ROM 32 comprises in particular:
a program 'prog' 320,

The algorithms implementing the steps of the method specific to the invention and described below are stored in the ROM 32 memory associated with the synchronization module 3 implementing these steps. When powered up, the microprocessor 31 loads and runs the instructions of these algorithms.

The random access memory 33 comprises in particular:
- in a register 330, the operating programme of the microprocessor 31 responsible for switching on the synchronization module 3;
- data 331 representative of the properties associated with the 3D devices of the network 1 (for example display frequency of images of 3D contents, shutting frequency of the left and right lenses of active glasses, time necessary to change from the shut state to the open state of a LCD panel associated with a lens of active glasses, formats supported for the transmission of data representative of 3D contents, formats supported for the receipt and decoding of data representative of 3D contents, etc.);
- data 332 representative of synchronization;
- data 333 representative of identification of 3D device groups.

The interfaces 35 and 36 are of the radio type and/or of the Ethernet type.

FIGS. 4A and 4B illustrate the temporal sequencing of the instructions that must be carried out for the rendering of a 3D content as well as the time constraints to be taken into account by the synchronization module 100 for the synchronization of the 3D devices of a group, according to two non-restrictive particular embodiments of the invention.

Any 3D device of the network 1 needs a certain time to process an item of information that it receives. For example, when a 3D source provides a frame comprising data packets representative of a 3D content (for example representative of left and right images of stereoscopic images) to a display device, the latter cannot render the content of the frame immediately upon the reception of the frame. A processing time is necessary to extract or decode the information, namely the data representative of the left and right images of a stereoscopic image for example. Likewise, a display panel of the LCD type cannot switch display from an image to a following one instantaneously. A few milliseconds are necessary to change from the display of an image to another one. If this time is not taken into account by the pair of active glasses associated with this display panel, the experience of the user watching the 3D content will not be very good. Indeed, the active glasses must block the vision of the user during the change from the display of an image to another one and the LCD panels associated with the lenses of the pair of active glasses must block the passage of light (occulted state of the lenses of the pair of active glasses). The transition between the display of an image and of another one must be the shortest possible for the quality of the rendering of the 3D content, the rendered content seeming to be all the more dark as the transition period between the display of two images is long.

These times required for the processing of data or of a received item of information are specific to each 3D device and are comprised in the information representative of the properties associated with each 3D device given to the synchronization module 100. Advantageously, the item of information representative of the properties associated with a 3D device is transmitted by the 3D device to the synchronization module when the 3D device is connected to the network 1. According to one variant, the synchronization module 100 recovers the information of a remote server on which the properties associated with each of the 3D devices are stored, the 3D device or the manufacturer of the 3D device being responsible for keeping this information up to date. According to another variant, the synchronization module has in memory a table comprising the properties associated with the 3D devices that a user updates according to the 3D devices connected to the network 1 via a GUI ("Graphical User Interface"). The properties associated with the 3D devices comprise in particular:
- for a device of the 3D source type, i.e. a device giving the data representative of a 3D content (for example data packet frames) to a display device: frame transmission rates supported (for example . . . ), formats used and supported for the transmission of data representative of 3D contents (for example . . . );
- for a device of the 3D display device type, supported formats of data representative of 3D contents, 3D source(s) with which the 3D display device is associated, data (or data packets) extraction time according to the data packing format used, time to change from the processing of an image (or of the associated frame or of the associated packet(s)) to another one;
- for a 3D device of the combined 3D source/display screen type: supported frame transmission rates (for example . . . ), time to change from the processing of an image (or of the associated frame or of the associated packet or packets) to another one;
- for a 3D device of the pair of active glasses type: time to change from the occulted state to the non-occulted (or transparent) state and conversely FIG. 4A illustrates the temporal constraints associated with the operation of the 3D devices of a group that a communication module must take into account for the management of the synchronization of the 3D devices of the group with each other, according to a first particular embodiment of the invention. The chain of 3D devices involved in the rendering of the 3D content (typically a stereoscopic image comprising a left image and a right image) illustrated on FIG. 4A comprises a 3D source (noted as S), a 3D display device (noted as D) and a pair of active glasses (whose left lens L and right lens R are represented) The synchronization module is noted as M. The illustrated time scale corresponds to the inter-frame time T, that is to say that a first frame representative of a first stereoscopic image is transmitted by the 3D source at time 0 and that a second frame representative of a second stereoscopic image following temporally the first stereoscopic image is transmitted by the 3D source at time T. The arrows represented on FIG. 4A illustrate each an instruction to be executed at a given time, the origin of the arrow being positioned at the level of the synchronization module M 41 to indicate at which time the processing of the instruction in question is required and the end of the arrow being positioned at the level of the 3D device which must carry out the instruction. At time 0, the 3D source S 42 must carry out the instruction 1, namely transmit the frame representative of the stereoscopic image to the display device D 43. The instruction 2 following temporally the instruction 1 corresponds to the occlusion of the right lens R by the pair of active glasses. Indeed, the first image contained in the frame representative of the stereoscopic image corresponds to the left image. Once the frame is transmitted by the source, the first instruction to be carried out taking account of the processing times is the occlusion of the right lens. The time slot 451 following immediately the right lens occlusion execution request corresponds to the time necessary to change from the non-occulted state to the occulted state. Once this time 451 has elapsed, the right lens R 45 of the pair of active lenses remains in the occulted state during the time slot 452. The instruction 3 following temporally the instruction 2 corresponds to the starting of the extraction of the data of the frame transmitted by the 3D source and of the rendering of the left image. This instruction 3 is executed by the display device D 43. The time slot 431 following the instant of reception of the execution request of the instruction 3 by D 43 corresponds to the time necessary to extract the data representative of the left image and to change from the display of the right image of the preceding stereoscopic image (time slot 430) to the display of the left image of the current stereoscopic image. As clearly illustrated on FIG. 4A, during the transition time for the display of two successive images (time slot 431), the left L 44 and right D 45 lenses are in the occulted state (time slots 440 and 452 respectively). The instruction 4 following temporally the instruction 3 corresponds to the change to the non-occulted state of the left lens L 44 so that the left eye can see the left image displayed on D 43. The time slot 441 following immediately the triggering of the change from the occulted state (time slot 440) to the non-occulted state (time interval (442) corresponds to the time necessary to change from the occulted state to the non-occulted state. Once these first 4 instructions are executed, it is noted that the time slot 442 during which L 44 is in the non-occulted state is comprised temporally in the slot 432 during which the left image is displayed on D 43 which ensures that the left eye only sees the displayed left image and nothing else. It is also noted that the time slot 452 during which R 45 is in the occulted state includes from a temporal point of view the slot 432 which ensures that the right eye sees neither the left image nor an image display transition period on D 43, limiting in this way the rendering defects. The instruction 5 is triggered when the content of the frame corresponds to the right image of the stereoscopic image and corresponds to the change from the non-occulted state (time slot 442) to the occulted state (time slot 444) of the left lens L 42 in order to block the vision of the left eye when the right image is displayed on D 43. The time to change from the non-occulted state to the occulted state corresponds to the time slot 443, this time having to be taken into account by the synchronization module so that the left lens L 43 is actually in the occulted state when the right image will be displayed. The instruction 6 posterior to the instruction 5 corresponds to the starting of the rendering of the right image, by the display device D 43, from information representative of the right image comprised in the frame T. The display of the right image is only effective after a time initiated by the instruction 6 and represented by the slot 433. This time corresponds to the time necessary to change from the display of the left image to the right image and is specific to D 43. The instruction 7 following the instruction 6 corresponds to the change from the occulted state (slot 452) to the non-occulted state (slot 454) of the right lens R 45 after the passage of a time (slot 453) specific to active glasses and more specifically to the LCD panel associated with the lenses which occults or lets the light pass. The instruction 7 is provided by the synchronization module M at a particular time so that the right lens does not change to the non-occulted state before the display of the right image on D 43 to avoid stereoscopic image rendering defects. According to the duration of the change from the occulted state to the non-occulted state, the instruction 7 is executed before the expiration of the period 433 (by ensuring that the period 433 will end before the period 453) or just after the expiration of the period 433 to ensure that the change to the non-occulted state of R 45 will occur after the actual display of the right image.

FIG. 4B illustrates the temporal constraints associated with the operation of the 3D devices of a group that a communication module must take into account for the management of the synchronization of the 3D devices of the group with each other, according to a second particular embodiment of the invention. The second embodiment differs from the first embodiment illustrated opposite FIG. 4A in that the 3D source and the 3D display device correspond to a single device (we speak of combined source/display device, noted as S+D 47). The chain of 3D devices involved in the rendering of the 3D content (typically a stereoscopic image comprising a left image and a right image) illustrated on FIG. 4B thus comprises a source+screen combined device (S+D) 47 and a pair of active glasses (whose left lens L 48 and right lens R 49 are represented), the synchronization module being noted as M 46. M 46 times the instructions that must be executed by the 3D devices by taking account of the processing times specific to each instruction and to each 3D device. The first instruction 1 correspond to the change to the occulted state (time slot 492) of R 49 after the passage of a period corresponding to the period (slot 491) necessary to change from the non-occulted state to the occulted state. The instruction 2 following temporally the instruction 1 corresponds to the starting of the rendering of the left image (slot 472) by S+D 47 after the passage of a period (slot 471) corresponding to the time necessary for S+D to extract the frame T representative of the stereoscopic image and change from the display of a right image of a preceding stereoscopic image to the display of the left image of the current stereoscopic image. The instruction 3 posterior to the instruction 2 corresponds to the change to the non-occulted state (slot 482) of L 48 after the expiration of a period (time slot 481) corresponding to the time necessary for L 48 to change from an occulted state (time slot 480) to the non-occulted state 482. As in the first embodiment, the taking into account of the times 471, 481 and 491 for the scheduling of the instructions 1 to 3 enables the right eye to be occulted throughout the duration of the display of the left image (by including advantageously all or part of the times for the change from one image to another of S+D, corresponding to the slots 471 and 473 in order not to darken the image rendering while enabling the left eye to see the display of the left image and nothing else by ensuring that the change to the non-occulted state of L 48 occurs after the beginning of the display of the left image. The instruction 4 following the instruction 3 corresponds to the change to the occulted state (time slot 484) of L 48 after the expiration of the period (time slot 483) corresponding to the time necessary for L 48 to change from the non-occulted state (time slot 482) to the occulted state. The instruction 5 posterior to the instruction 4 corresponds to the display of the right image (time slot 474) of the current stereoscopic image by S+D 47 after the expiration of a period (time slot 473) corresponding to the time necessary for S+D 47 to change from the display of the left image (time slot 472) to the display of the right image. The last instruction intervening during the time of the frame T is the instruction 6 which corresponds to the change to the non-occulted state (time slot 494) of R 49 after the expiration of a period (time slot 493) necessary for R 49 to change from the occulted state (time slot 492) to the non-occulted state. The taking into account of the times 473, 483 and 493 for the scheduling of the instructions 4 to 6 enables the vision of the left eye to be occulted throughout the duration of the display of the right image (by including advantageously all or part of the times for the change from one image to another of S+D, in order not to darken the image rendering) while enabling the right eye to see the display of the right image and nothing else by ensuring that the change to the non-occulted state of R 49 occurs after the beginning of the display of the right image.

The synchronization module takes advantageously into account all the times 431, 441, 451, 433, 443, 453 and T (first embodiment) or times 471, 481, 41, 473, 483, 493 and T (second embodiment) to control and require the execution of the instructions 1 to 7 or 1 to 6 respectively by the relevant 3D devices. The synchronization information sent by the synchronization module to all the 3D devices advantageously comprises control messages comprising in particular information representative of the time t at which an instruction must be executed by a 3D device. Advantageously, the synchronization information is comprised in a signal sent to all the 3D devices of a group, each 3D device of the group receiving all the information representative of the times at which the instructions must be executed by the 3D devices. In other words, the synchronization information comprises a single control message comprising all the orders of executions of instructions of all the 3D devices. According to one variant, the synchronization module sends a synchronization signal for each 3D device, the signal intended for a given 3D device only comprising the information representative of the times t intended for the given 3D device. According to this variant, each synchronization signal comprises a control message intended for a particular 3D device and comprises the order of execution of the instructions that must be executed by this particular device. According to another variant, a particular synchronization signal is intended for several 3D devices among the plurality of 3D devices, for example in the case where a group comprises several 3D devices having the same properties (for example the active glasses 120 and 121 of the second group 2 of FIG. 1). The content of the control message(s) sent by the synchronization module differs according to the 3D device(s) for which it is intended. For a 3D source, the control message indicates at which time the frame representative of the 3D content (for example a stereoscopic image or images) must be transmitted. For a 3D display device, the control message indicates at which time to display the left image and at which time to display the right image of a stereoscopic image. For a combined source+display device, the control message indicates at which time to display the left image and at which time to display the right image of a stereoscopic image. For a pair of active glasses, the control message indicates at which time to allow the vision of the left eye, at which time to occult the vision of the left eye, at which time to allow the vision of the right eye and at which time to occult the vision of the right eye. In the case where the content to be displayed is no longer a 3D content but a 2D content, the control message advantageously comprises an item of information representative of the change to a 2D mode for the relevant 3D devices.

Advantageously, the 3D devices of the network 1 and the synchronization module are slaved to the same clock so that the same time base for the execution of the instructions 1 to 7 is used, ensuring a perfect synchronization of the 3D devices of the group with each other. The 3D devices of the network 1, the synchronization module and the gateway are synchronized according to any methods known by those skilled in the art, such as for example the GPS synchronization or by slaving to a reference clock. The protocols used for the slaving to a reference clock are for example NTP ("Network Time Protocol") according to the IETF RFC 5905 standard or PTP ("Precision Time Protocol") according to the IEEE 1588 standard. These protocols provide standardized methods to synchronize devices on a LAN ("Local Area Network") corresponding for example to the network 1, with a precision in the order of 200 microseconds for NTP and less than the microsecond for PTP. The PTP protocol enables a master clock associated with the synchronization module to be synchronized with slave clocks associated with the 3D devices of the network 1. Each device of the network 1 is advantageously capable of maintaining a local clock in such a way that each device remains synchronized with the synchronization module even when the connection to the synchronization module is interrupted. According to a particularly advantageous variant, to take account of the latency variations in the network 1, the synchronization module advantageously adds a margin to the latency time associated with each 3D device (this latency information being advantageously measured for each 3D device and transmitted to the synchronization module). The time at which a 3D device must execute an instruction is estimated by the synchronization module by taking account of the processing times associated with the 3D device as well as the latencies of the network 1, (a latency being associated with a 3D device and with the type of connection between the 3D device and the synchronization module) and the determined margin. The sum of the latency associated with a 3D device and of the margin is called maximum transmission time or even timing guard value. When the synchronization module sends a signal to the devices D of a group to execute one or more instructions, the execution time(s) comprised in the message correspond to the current time of the clock of the synchronization module increased by the maximum transmission time (for each 3D device). According to one variant, the maximum transmission time is updated on demand or regularly to take account of the events occurring on the network likely to modify the time necessary for the routing of a message sent by the synchronization module to one or more 3D devices. The time necessary for the rendering of a stereoscopic image is consequently variable but no de-synchronization related to the variation of the latency of the network 1 appears, ensuring a good rendering quality of the stereoscopic image.

FIG. 5 illustrates a synchronization method implemented in the synchronization module 3 of FIG. 3, corresponding for example to the synchronization module 100 of FIG. 1, according to a particular non-restrictive embodiment of the invention.

During an initialization step 50, the different parameters of the synchronization module are updated. In particular, the parameters corresponding to the groups of 3D devices and the synchronization parameters of the 3D devices are initialized in any way (for example, following the reception of initialization messages sent by a server not represented of the system 1, or even by commands of an operator).

Then, during a step 51, one or more first groups are created by the synchronization module 100, each first group comprising at least two 3D devices, among which at least one pair of active glasses and a display device suitable for the temporal sequential display of a first image (for example left image) and of a second image (for example right image) of a stereoscopic image or of a series of stereoscopic images. The creation of the groups is made by taking account of the properties associated with each 3D device. These properties are advantageously received by the synchronization module of the 3D devices themselves, for example during the connection of a 3D device to the network comprising the synchronization module or when one or more properties associated with the 3D device is (are) modified. According to one variant, the properties associated with the 3D devices are stored on a remote server (for example a web server) and are recovered by the synchronization module on request of the synchronization module or when the synchronization module connects for the first time to the network. According to this variant, the updating of the properties of the 3D devices at the level of the synchronization module is planned regularly or is made on request of the synchronization module or is made during the initialization of the synchronization module. According to yet another variant, the properties of the 3D devices are stored on appropriate tables in a memory of the synchronization module, these tables being for example filled in upon the construction of the synchronization module or by the user (or an administrator) of the synchronization module.

Advantageously, a second group comprising at least a 3D device (for example a display device) is created in parallel to the first group(s) by the synchronization module 100. The creation of the second group is made by taking account of the properties associated with the 3D device(s) which compose it, in particular when the 3D device(s) of the second group is (are) not compatible with the 3D devices of the first group(s), for example when the display frequency range of stereoscopic images of a display screen of the second group is not compatible with the display frequency range of stereoscopic images of a display screen of a first group or is not compatible with the transmission frequency of stereoscopic images of a receiver/decoder of a first group (i.e. when the frequency range supported by the 3D device of the second group does not overlap (not even partly) the frequency range supported by any of the 3D devices of a first group).

The property or properties of the 3D devices to be taken into account for the creation of the first group(s) comprises advantageously:
  a display frequency or a display frequency range of the stereoscopic images and of the first and second images of the stereoscopic images supported (with regard to 3D devices of the display device or combined source/display device type);
  a shutting frequency or a range of shutting frequencies supported (with regard to 3D devices of the pair of active glasses type);
  a transmission frequency or a range of transmission frequencies of data representative of stereoscopic images supported (with regard to 3D devices of the 3D source type);
  a packing format or formats of data representative of stereoscopic images supported (with regard to 3D devices of the 3D source or 3D display device type)
A 3D device is associated with a first group if and only if the property or properties that are associated with it are not incompatible with one of the 3D devices belonging or likely to belong to the first relevant group.

Advantageously, the number of first and second created groups is the smallest possible, for example 1, 2 or 3 first and second groups, the first and second groups being automatically created by the synchronization module. Upon the creation of a first or second group, an identifier is associated with it. The creation of the first group starts by example by the association of a first 3D device. Then the synchronization module reviews the other 3D devices of the network one after the other by checking whether the properties associated with these other 3D devices are compatible with the properties associated with the first 3D device associated with the first group. If this is the case, the identifier of the first group is associated with the 3D device in question and, if this is not the case, a second group with a second identifier is created and the 3D device in question is associated with this second identifier. According to one variant, the user chooses to partition the groups created automatically by the synchronization module to have more groups. According to this variant, the user chooses for example to de-associate the pair of active glasses from the first group to associate it with a second group of 3D devices different from the first group in that it comprises at least one 3D device not belonging to the first group. When a 3D device is associated with a first group of 3D devices and when this 3D device supports a range of values at the level of its properties, the 3D device in question receives information representative of the value to be parameterized to operate with the other 3D devices of the relevant group. The association of the pair of active glasses with the second group advantageously comprises a step for transmitting a second item of synchronization information to the second group so as to synchronize the pair of active glasses with the 3D device(s) of the second group for the rendering of stereoscopic images.

Lastly, during a step 52, a first item of synchronization information is transmitted to the 3D devices of the first group or groups created. This first item of synchronization information enables the 3D devices of the first created group(s) to operate together so as to render the stereoscopic image or images, that is to say that the first item of synchronization information comprises information on the timing of the operations that must be executed by the 3D devices for the rendering of the stereoscopic image or images. The first item of synchronization information is indifferently transmitted via a wireless transmission channel or a wired transmission channel. According to an optional variant, the synchronization information takes account of a maximum transmission time. The synchronization information transmission time is advantageously estimated by each of the 3D devices and the estimated value is returned to the synchronization module. The maximum transmission time advantageously corresponds to the longest transmission time. According to one variant, the maximum transmission time corresponds to the average transmission time to which a margin is added so that the value associated with the maximum transmission time is greater than each estimated transmission time.

According to another variant, a control message or messages comprising the instructions that must be executed by the 3D devices of the first group or groups are transmitted. These control messages comprise for example the identifier of the 3D device for which they are intended, the instruction to be executed and the time at which the instruction must be executed.

Naturally, the invention is not limited to the embodiments previously described.

In particular, the invention is not limited to a method and to a synchronization device but extends to a system comprising the synchronization device.

Advantageously, the format of the 3D contents rendered by the group or groups of 3D devices corresponds to any format of 3D video content known by those skilled in the art and is not limited to a 3D content of the stereoscopic image type comprising a left image and a right image. The 3D content corresponds for example to a video image with which a disparity card is associated or even to a pair of left and right images, a card of disparity of the left image with respect to the right image being associated with the left image and a card of disparity of the right image with respect to the left image being associated with the right image. According to one variant, the 3D content corresponds to a stereoscopic image comprising more than two views, for example 3, 4, 5 or 10 views.

The invention claimed is:
1. A method of synchronization of a set of 3D devices configured for processing data representative of at least one stereoscopic image, the at least one stereoscopic image comprising a first image and a second image representative of a same scene according to respectively a first point of view and a second point of view, the method comprising:

creating one first group comprising at least two first 3D devices of the set and one second group comprising at least one second 3D device of the set according to at least a property associated with each of the at least two first 3D devices and at least one second 3D device, the first group comprising a pair of active glasses and at least a display device suitable for a sequential display of the first and second images of the at least one stereoscopic image, at least a property associated with at least one second 3D device of the second group being not compatible with at least a property associated with at least one of the at least two first 3D devices, transmitting a first synchronization information to the at least two first 3D devices of the at least one first group to synchronize the at least two first 3D devices for rendering the at least one stereoscopic image, de-associating the pair of active glasses from the first group, associating the pair of active glasses with said second group, and transmitting a second synchronization information to said second group to synchronize the at least one second 3D device of the second group with the pair of active glasses for rendering the at least one stereoscopic image.

2. The method according to claim 1, further comprising receiving information representative of properties associated with each of the at least two first 3D devices and with the at least one second 3D device.

3. The method according to claim 1, further comprising associating a 3D device configured for providing the data representative of the at least one stereoscopic image to the first group.

4. The method according to claim 1, wherein the at least one property is chosen among:
   a stereoscopic image display frequency;
   a shutting frequency;
   a stereoscopic image transmission frequency; and
   a compatibility with a packing format of data representative of a stereoscopic image.

5. The method according to claim 1, further comprising estimating a maximum transmission time of the first item of synchronization information to the 3D devices of the first group, the first item of synchronization information taking account of the maximum transmission time.

6. The method according to claim 1, wherein the first item of synchronization information transmitted to the 3D devices of the first group depends on a time of execution of an instruction by a 3D device associated with each 3D device of the first group.

7. The method according to claim 1, further comprising transmitting at least one control message representative of an instruction to be executed to the first group, the at least one control message being associated with at least one 3D device of the first group.

8. The method according to claim 1, wherein the first item of synchronization information is transmitted via a wireless transmission channel.

9. The method according to claim 1, wherein the first item of synchronization information is transmitted via a wired transmission channel.

10. A device configured for synchronizing a set of 3D devices suitable for processing data representative of at least one stereoscopic image, the at least one stereoscopic image comprising a first image and a second image representative of a same scene according to respectively a first point of view and a second point of view, wherein the device comprises at least one processor configured for:

creating one first group comprising at least two first 3D devices of the set and one second group comprising at least one second 3D device of the set according to at least a property associated with each of the at least two first 3D devices and at least one second 3D device, the first group comprising a pair of active glasses and at least a display device suitable for a sequential display of the first and second images of the at least one stereoscopic image, at least a property associated with at least one second 3D device of the second group being not compatible with at least a property associated with at least one of the at least two first 3D devices, transmitting a first synchronization information to the at least two first 3D devices of the at least one first group to synchronize the at least two first 3D devices for rendering the at least one stereoscopic image, de-associating the pair of active glasses from the first group, associating the pair of active glasses with said second group, and transmitting a second synchronization information to said second group to synchronize the at least one second 3D device of the second group with the pair of active glasses for rendering the at least one stereoscopic image.

11. The device according to claim 10, wherein the at least one processor is further configured for receiving information representative of properties associated with each of the at least two 3D devices.

12. The device according to claim 10, wherein the at least one processor is further configured for associating a 3D device configured for providing the data representative of the at least one stereoscopic image to the first group.

13. The device according to claim 10, wherein the at least one property is chosen among:
   a stereoscopic image display frequency;
   a shutting frequency;
   a stereoscopic image transmission frequency; and
   a compatibility with a packing format of data representative of a stereoscopic image.

14. The device according to claim 10, wherein the at least one processor is further configured for calculating a maximum transmission time of the first item of synchronization information to the 3D devices of the first group, the first item of synchronization information taking account of the maximum transmission time.

15. The device according to claim 10, wherein the first item of synchronization information transmitted to the 3D devices of the first group depends on a time of execution of an instruction by a 3D device associated with each 3D device of the first group.

16. The device according to claim 10, wherein the at least one processor is further configured for transmitting at least one control message representative of an instruction to be executed to the first group, the at least one control message being associated with at least one 3D device of the first group.

17. The device according to claim 10, wherein the first item of synchronization information is transmitted via a wireless transmission channel.

18. The device according to claim 10, wherein the first item of synchronization information is transmitted via a wired transmission channel.

\* \* \* \* \*